US011112341B1

(12) United States Patent
Martiska

(10) Patent No.: US 11,112,341 B1
(45) Date of Patent: Sep. 7, 2021

(54) APPARATUS FOR MEASURING THE SPREADABILITY OF POWDERS AND GRANULAR MATERIALS

(71) Applicant: Gregory Peter Martiska, Newtown, CT (US)

(72) Inventor: Gregory Peter Martiska, Newtown, CT (US)

( * ) Notice: Subject to any disclaimer, the term of this patent is extended or adjusted under 35 U.S.C. 154(b) by 0 days.

(21) Appl. No.: 16/864,231

(22) Filed: May 1, 2020

(51) Int. Cl.
*G01N 11/10* (2006.01)

(52) U.S. Cl.
CPC .................................. *G01N 11/10* (2013.01)

(58) Field of Classification Search
CPC ...................................................... G01N 11/10
See application file for complete search history.

(56) References Cited

U.S. PATENT DOCUMENTS

| 10,620,103 | B2  | 4/2020  | Godfrey |         |
|------------|-----|---------|---------|---------|
| 2016/0103052 | A1* | 4/2016 | Jimma   | G01N 11/04 73/54.03 |
| 2019/0105843 | A1 | 4/2019 | Sahran  |         |
| 2019/0353569 | A1* | 11/2019 | Godfrey | B22F 12/00 |

OTHER PUBLICATIONS

Zackary Snow, Riichard Martukanitz, and Sanjay Joshia, On the Development of Powder Spreadability Metrics and Feedstock Requirements for Powder Bed Fusion, Additive Manufacturing vol. 28, Aug. 2019, pp. 78 to 86, ISSN: 2214-8604.
Shinnosuki Yamada and Nobuyuki Takahashi, Development of Evaluation Technique for Powder Bed Quality in SLM Process by Image Processing, Electric Steel Works vol. 88 Issue 1 2017.

* cited by examiner

*Primary Examiner* — Paul M. West
*Assistant Examiner* — Mark A Shabman

(57) ABSTRACT

An apparatus is provided for measuring the spreadability of powders and granular materials for applications that require powders to be spread in a thin layer. The apparatus consists of a test surface or powder bed for receiving a material sample layer, one or more spreading devices that form a layer of material sample on the test surface or powder bed when there is relative motion between the test surface or powder bed and the spreading device, and one or more scraping blades that remove the layer of material sample created by the spreading device from the test surface or powder bed and move it to one or more measuring devices to determine the amount of material in the layer of the material sample. The amount and consistency over time of sample material removed by the scraping blade from the test surface or powder bed indicate the spreadability of the material sample.

6 Claims, 3 Drawing Sheets

APPARATUS FOR MEASURING THE SPREADABILITY OF POWDERS AND GRANULAR MATERIALS

CROSS-REFERENCE TO RELATED APPLICATION

Not Applicable

BACKGROUND OF THE INVENTION

1) Field of the Invention

This invention relates to an apparatus for measuring the spreadability of powder and granular materials. For powder applications, spreadability can defined as the ease and consistency with which a powder can be distributed in a uniform layer. The spreadability of a powder is a critical for many applications where the powder must form a thin and continuous layer over a wide area. The largest application at present is additive manufacturing were powder is spread in a layer as small as twenty microns over a wide area. The apparatus will automatically determine the spreadability of a material sample using various spreading geometries and pressures, at various layer thicknesses, at various spreading speeds, and under various environmental conditions. This allows the apparatus to mimic existing powder spreading devices and point to new designs.

2) Description of the Related Art

Currently there are no commercially available apparatus or devices for measuring powder spreadability. Powder spreadability is either determined by studying the powder performance in the actual application machine or by assembling a spreading device and visually inspecting the spreading layer.

For additive manufacturing applications, powder is loaded into an additive manufacturing machine that spreads the powder into thin layers. The spreadability of the powder is typically evaluated by visually inspecting the uniformity of each layer. This is done by eye or by using an image acquisition system with or without image analysis software. An example of this approach is disclosed by Shinnosuki Yamada and Nobuyuki Takahashi in Electric Steel Works Volume 88 Issue 1 2017. In this example, the surface of powder bed in an additive manufacturing printer is analyzed by image analysis. Analyzing the powder layer in the actual application is the most accurate method for determining if the powder will spread in the actual application. The problem is that this takes a large amount of powder, a large amount of time in test time and cleanup, and prevents the machine from making parts during testing. This approach is therefore only practical for indicating problems during production.

Another approach to using the actual spreading machine is disclosed in US Patent Application 2019/0105843 A1. In this method, the additive manufacturing machine is combined with an optical sensor to test the spreadability of the powder. The problem is that using the machine to test powders prevents the machine from making parts during testing. In addition, a powder additive manufacturing machine is typically very expensive so it would not be purchased for simple powder testing.

An example of many of the papers involving spreading devices is disclosed by Zackary Snow, Richard Martukanitz, and Sanjay Joshia in the paper On The Development Of Powder Spreadability Metrics And Feedstock Requirements For Powder Bed Fusion in Additive Manufacturing Volume 28, August 2019. In this example, the authors built a machine to spread the powder on a flat plat that could be analyzed by image analysis. Additional cameras and sensors are used to make other measurements. This approach uses much less powder than an additive manufacturing machine but quantifying the spreadability is not straightforward. This type of machine can also be hard to build and maintain. In addition, the powder is only spread on a flat plate and not on a powder bed as in a real application. The machine also does not measure the density of the powder layer.

Another example of a spreading device is disclosed in in U.S. Pat. No. 10,620,103. This devices creates a layer of powder on a test surface and uses visual evaluation to determine the spreadability of the powder. Using a visual evaluation alone makes it difficult to measure the actual spreadability of the sample powder and the machine does not directly measure the density of the powder layer or the uniformity of the layer density. In addition, changing the spreading parameters could be difficult and the machine has limited travel.

BRIEF SUMMARY OF THE INVENTION

After designing several powder flow testers including apparatus described in U.S. Pat. Nos. 8,438,914 and 8,335,343, the inventors of the present invention determined that industry and academia needed an apparatus to measure the spreadability of powders that is easy to use, easy to maintain, can be altered easily to change spreading mechanisms, and uses only a small amount of sample powder. This would allow researchers to simulate powder spreading behavior in many types of additive manufacturing and other industrial material handling machines that form powders into thin layers.

The invention consists of a test surface or powder bed for receiving a material sample, one or more spreading devices that form a layer of material sample on the test surface or powder bed due to the relative motion between the test surface or powder bed and the spreading devices, and one or more scraping blades to remove the layer of material sample left by the spreading devices from the test surface or powder bed and move it to one or more measuring devices to determine the amount of material in the layer of the material sample. The amount and consistency over time of sample material scraped from the test surface or powder bed indicate the spreadability of the material sample.

DETAILED DESCRIPTION OF THE INVENTION

Figure 1:
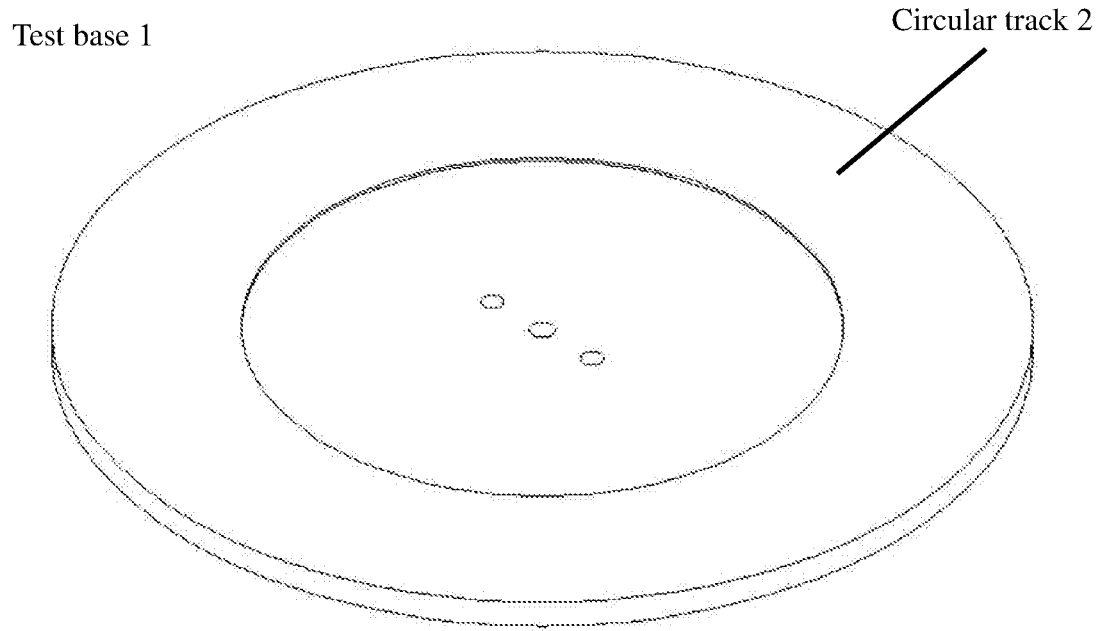
FIG. 1 presents a drawing of the preferred embodiment of the test surface with circular track.
Figure 2:
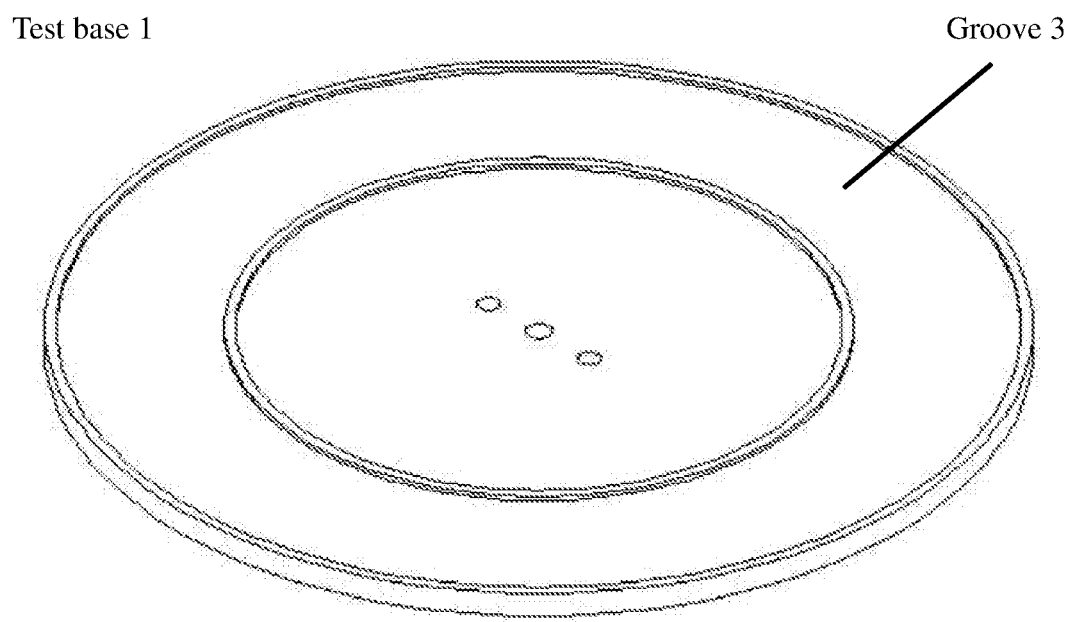
FIG. 2 presents a drawing of the preferred embodiment of the test surface with powder groove.

The preferred embodiment of the invention is shown in FIG. 1 through FIG. 5. The apparatus consists of a test surface as shown in FIG. 1 and FIG. 2. The test surface 1 is circular and has a circular track 2 around its perimeter. The other side of the test surface 1 has a groove 3 with flat sides. Powder spreadability can be tested against the test surface material or against a powder bed powder depending on which side of the test surface 1 is facing up. If the circular track 2 of the test surface 1 is facing up then spreadability is measured against the test surface material. If the groove 3 of the test surface 1 is facing up then spreadability is measured against a powder bed when the groove 3 of the test surface 1 is is filled with sample powder. Additive manufacturing machines typically spread powder on top of a powder bed so spreadability against a powder bed is closer to the application.

Figure 3:
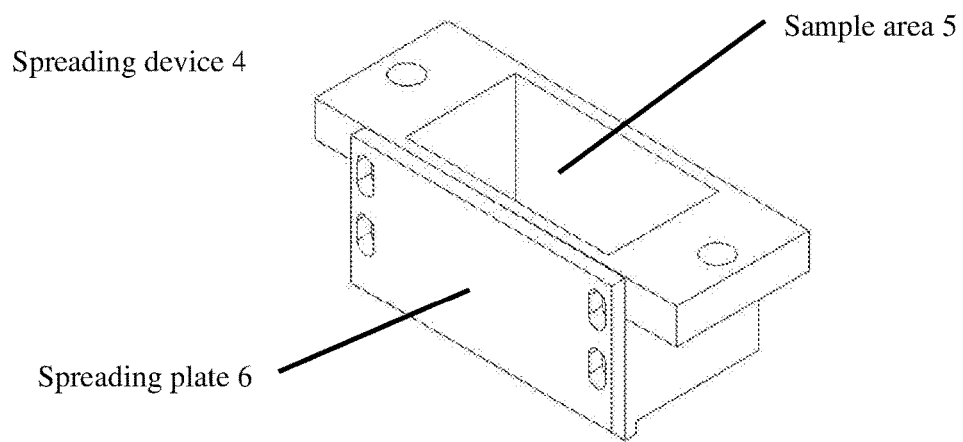
FIG. 3 presents a drawing of the preferred embodiment of the spreading device.
Figure 4:
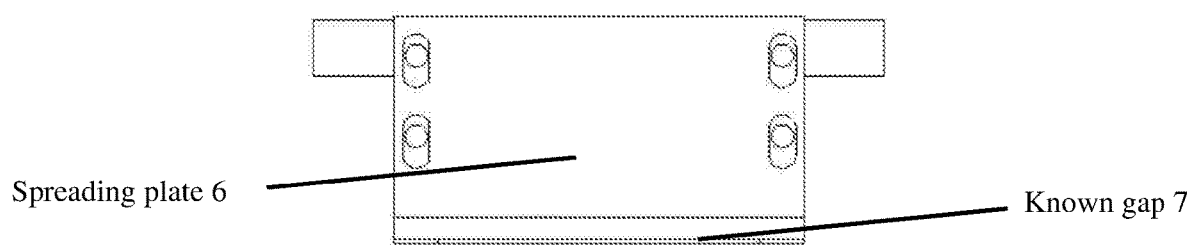
FIG. 4 presents a drawing of the preferred embodiment of the known gap

The spreading device 4 is shown in FIG. 3. The spreading device 4 consists of a rectangular sample area 5 with an open bottom and top. The front side of the rectangular sample area 5 consists of a spreading plate 6. The spreading plate is movable in the vertical direction so that a known gap 7 can be maintained between the base of the spreading device 4 and the spreading plate 6. The bottom of the spreading plate 6 can be flat, angled, round, consist of a rotating roller, or can configured in other shapes to mimic the spreading devices in different applications.

The test surface 1 is mounted on a motorized spindle 8 that rotates the test surface 1 at programmable rotation speeds. The spreading device 4 is mounted on position rods above the test surface 1 that holds it in place horizontally but allows it to move in the vertical direction. The bottom of the spreading device 4 is in contact with the test surface 1 and a known gap 7 is formed between the test surface 1 and the bottom of the spreading plate 6. A collection container 9 is placed on top of a load cell 10 and positioned at the outer edge of the scraping blade 11. The scraping blade 11 is angled relative to the rotation of the test surface 1 and in contact with the test surface 1 so that sample powder on the test surface 1 will flow off of the test surface 1 and into the collection container 9 when the test surface 1 is rotated.

To test spreadability, a material sample of powder is transferred into the rectangular sample area 5 of the spreading device 4. The test surface 1 is rotated by the motorized spindle 8 and sample powder passes through the known gap 7 and is spread on the test surface 1. At some point the powder that is spread on the test surface 1 reaches the scraping blade 11 and is moved off of the test surface 1 and into the collection container 9 where it is weighed at high frequency by load cell 10. The volume created by the motion between the spreading device 4 and the test surface 1 is calculated using the height and width of the known gap 7 between the spreading plate 6 and test surface 1 and the number of rotations of the test surface 1. Therefore the spreading density as well as the consistency of the spreading density can be determined by measuring the weight of material sample in the collection container 9 at fixed time intervals. The volume of sample in the collection container 9 can also be measured. The preferred embodiment uses a load cell to measure the weight of the material sample moving into the collection container in real time. A balance can also be used to measure the weight of material after a fixed analysis time.

The spreadability of the powder can be measured under various compaction forces by placing weights on top of the powder in the spreading area. Different spreading geometries can be studied by changing the shape of the base of the spreading plate. Different environmental conditions can be studied by heating the apparatus or changing the moisture content of the gasses around the apparatus. Another embodiment of the invention is a linear device that uses a rectangular surface moving on a linear path with the spreading and scraping devices working similarly.

Figure 5:
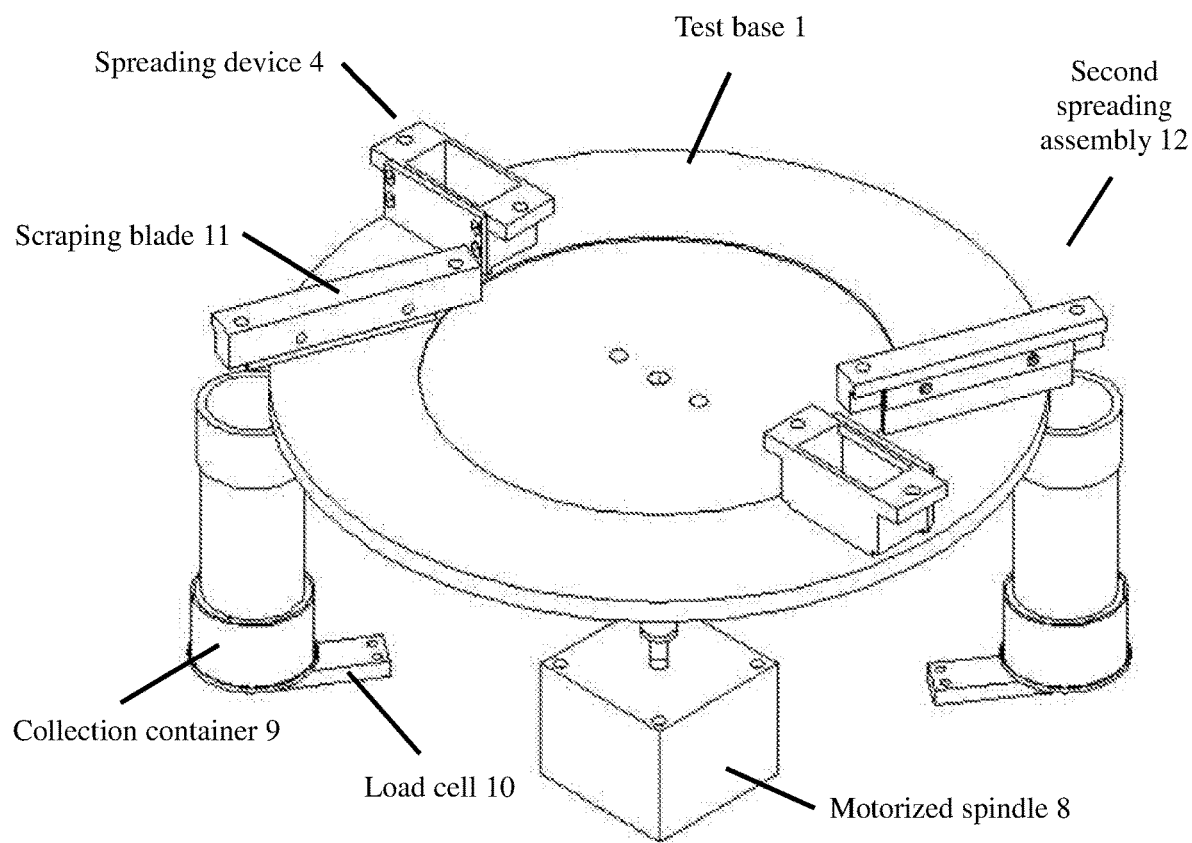
FIG. 5 presents a drawing of the preferred embodiment of the assembled apparatus.

There are two main advantages to using a circular rotating surface as opposed to a rectangular surface. The first is that the powder can be spread with unlimited travel. The surface can be rotated until all of the sample powder has been spread. The second is that multiple spreading devices can be mounted on the circular surface so that multiple samples or multiple layer thicknesses can be studied. A second spreading assembly 12 is shown in FIG. 5. A rectangular surface moving linearly would allow only two spreading devices to work simultaneously and would have travel limited by the length of the rectangular surface.

What is claimed is:

1. An apparatus for measuring the spreadability of powders and granular material comprising:
    a) a test surface for receiving material samples to be investigated;
    b) one or more spreading devices that allow material samples to be spread on the test surface when there is relative motion between the spreading devices and the test surface;
    c) one or more scraping devices to move the material samples spread on the test surface into one or more collection containers when there is relative motion between the scraping devices and the test surface;
    d) a means for causing relative motion between the test surface and the one or more spreading devices and the one or more scraping devices; and
    e) a measuring unit with a means for measuring the weight and/or volume of the material samples in the one or more collection containers while the relative motion is occurring.

2. An apparatus according to claim 1 where said test surface is circular.

3. An apparatus according to claim 1 where said test surface is circular and grooved to contain a layer of the material samples.

4. An apparatus according to claim 1 where said measuring unit consists of one or more load sensing devices mounted on the apparatus to measure the weights of the material samples in the collection containers.

5. An apparatus according to claim 1 where said measuring unit consists of an external balance to measure the weights of material samples in the one or more collection containers.

6. An apparatus according to claim 1 where said test surface is rectangular with a smooth or grooved face.

* * * * *